United States Patent
Brinch

(10) Patent No.: US 12,529,387 B2
(45) Date of Patent: Jan. 20, 2026

(54) NON-RESISTIVE CIRCULATION TO ELEVATED CONTAINERS

(71) Applicant: CyberIT Systems AS, Bergen (NO)

(72) Inventor: Knut Christian Brinch, Bergen (NO)

(73) Assignee: CyberIT Systems AS, Bergen (NO)

( * ) Notice: Subject to any disclaimer, the term of this patent is extended or adjusted under 35 U.S.C. 154(b) by 191 days.

(21) Appl. No.: 18/548,594

(22) PCT Filed: Mar. 2, 2022

(86) PCT No.: PCT/NO2022/050056
§ 371 (c)(1),
(2) Date: Sep. 1, 2023

(87) PCT Pub. No.: WO2022/186699
PCT Pub. Date: Sep. 9, 2022

(65) Prior Publication Data
US 2024/0147969 A1 May 9, 2024

(30) Foreign Application Priority Data
Mar. 2, 2021 (NO) .................................. 20210273

(51) Int. Cl.
*F04F 10/00* (2006.01)
*A01K 63/04* (2006.01)
*E03B 11/00* (2006.01)
*F03B 17/00* (2006.01)

(52) U.S. Cl.
CPC ............ *F04F 10/00* (2013.01); *A01K 63/047* (2013.01); *E03B 11/00* (2013.01); *F03B 17/005* (2013.01)

(58) Field of Classification Search
CPC ........ F04F 10/00; F04F 99/00; A01K 63/047; E03B 11/00; E03B 17/005; F03B 17/04
USPC ................ 137/127, 255, 256, 263, 391, 571
See application file for complete search history.

(56) References Cited

U.S. PATENT DOCUMENTS

| 6,161,561 | A | 12/2000 | Pratt et al. | |
|---|---|---|---|---|
| 2001/0000601 | A1* | 5/2001 | Kim ....................... | A01K 63/04 210/776 |
| 2008/0202998 | A1* | 8/2008 | Tseng ................... | A01K 63/045 210/167.21 |

(Continued)

FOREIGN PATENT DOCUMENTS

| CA | 2681089 A1 | 12/2009 |
|---|---|---|
| CN | 205390024 U | 7/2016 |

(Continued)

OTHER PUBLICATIONS

The extended European search report, dated Jan. 20, 2025, 29 pages.

(Continued)

*Primary Examiner* — Kelsey E Cary
(74) *Attorney, Agent, or Firm* — Alix, Yale & Ristas, LLP

(57) ABSTRACT

The invention relates to circulation of fluids to an elevated container in general and more specifically a system and a method for circulation of fluids in a non-resistive manner to an elevated container with at least one fluid source container, at least one closed container for circulation, at least one elevated fluid container, at least one circulation mechanism for the purpose of circulation, and at least one start-stop mechanism for the purpose of circulation control.

15 Claims, 12 Drawing Sheets

(56) References Cited

U.S. PATENT DOCUMENTS

2016/0113249 A1* 4/2016 Kuo .................... C02F 1/24
                                              210/167.26
2021/0084871 A1    3/2021 Emblem

FOREIGN PATENT DOCUMENTS

| CN | 108350867 A | 7/2018 |
| FR | 388632 A | 8/1908 |
| GB | 484564 A | 5/1938 |
| WO | 2019125175 A1 | 6/2019 |

OTHER PUBLICATIONS

Swedish Intellectual Property Office, International Search Report issued Jun. 8, 2022, for International Patent Application No. PCT/NO2022/050056.

* cited by examiner

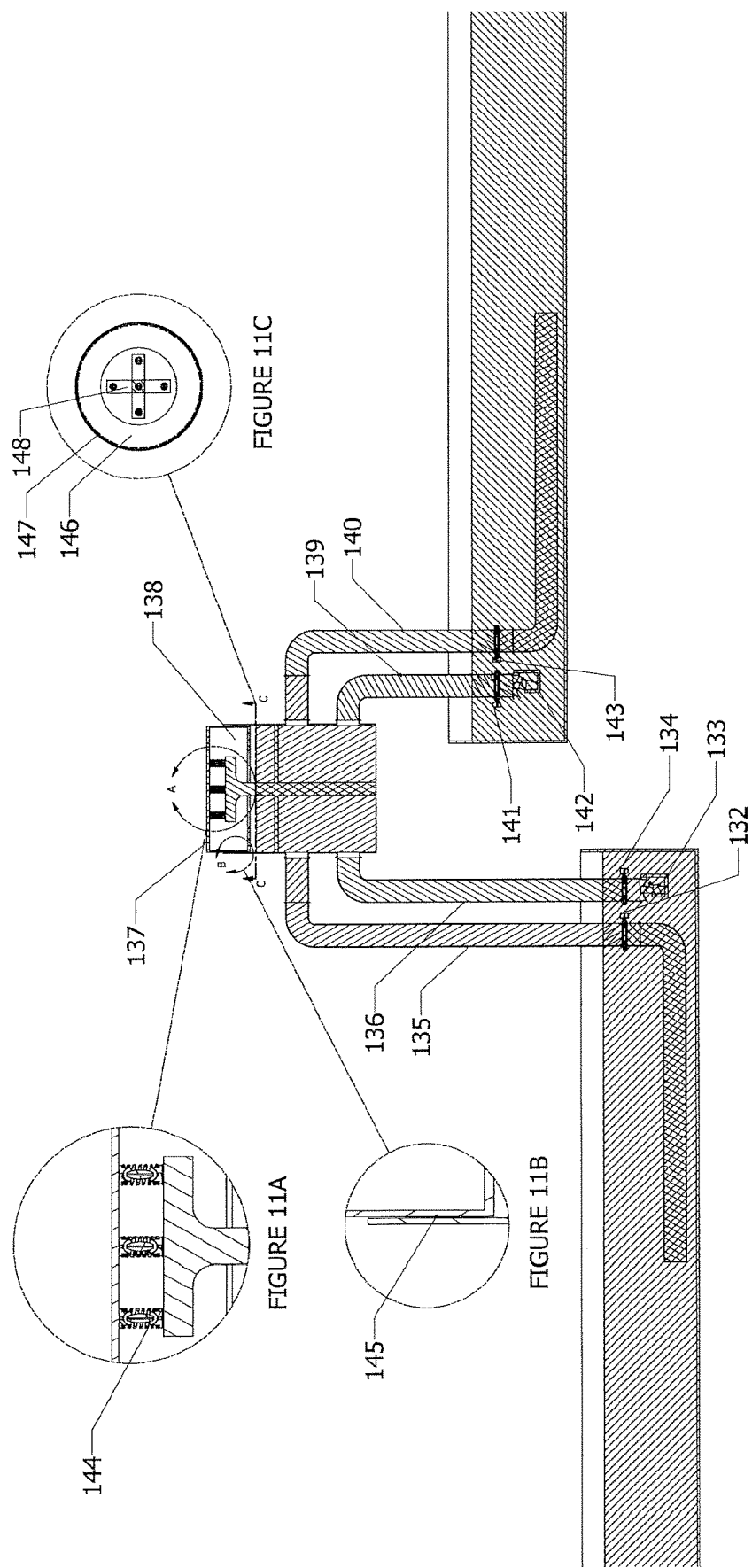

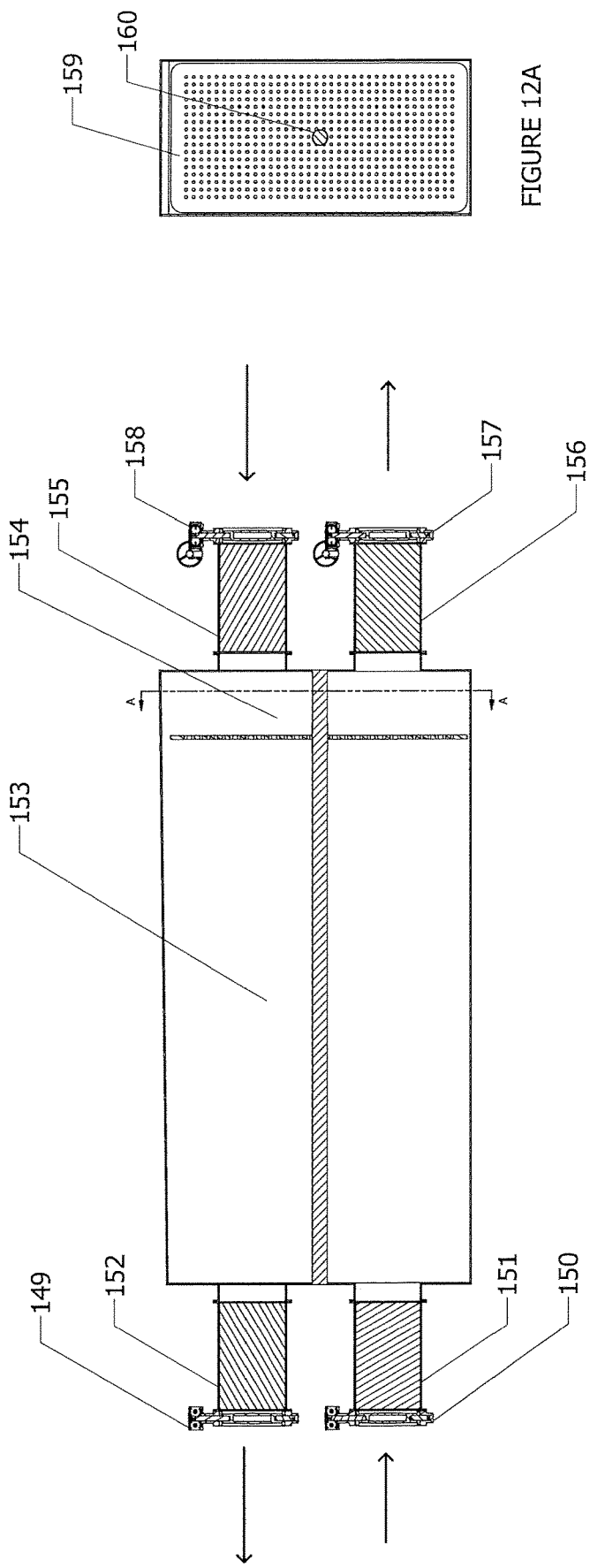

NON-RESISTIVE CIRCULATION TO ELEVATED CONTAINERS

PRIORITY CLAIM AND CROSS-REFERENCE

The present application is a National Stage Application, filed under 35 U.S.C. 371, of International Patent Application No. PCT/NO2022/050056, filed on Mar. 2, 2022, which claims the priority of Norwegian Patent Application No. 20210273, filed Mar. 2, 2021, each of which is incorporated herein by reference in its entirety.

BACKGROUND OF THE INVENTION

Technical Field

The invention relates to circulation of fluids to an elevated container in general and more specifically a system and a method for circulation of fluids in a non-resistive manner to an elevated container with at least one fluid source container, at least one closed container for circulation, at least one elevated fluid container, at least one circulation mechanism for the purpose of circulation, and at least one start-stop mechanism for the purpose of circulation control.

Background Art

From prior art one should refer to traditional circulation using pumps where they transport fluid from a source container to another container, where the fluid flows from the source into the end container in an additive manner, until the existing fluid in the end container is displaced by the source fluid.

One group of methods are describing the source fluid as the sea, used to contain sea animals, and where the circulation is naturally occurring through permeable nets. This group may also take the form of sea-based containers with semi-permeable or non-permeable walls where circulation is maintained by some form of circulation mechanism.

The most significant variation of the methods are elevated containers on land, where the circulating mechanism needs to use energy for transportation of fluid to elevated positions. This requires the circulation mechanism to obtain enough energy to overcome the hydrostatic pressure and fluid weight by moving the water to an elevated position.

These methods are referred to as normal fluid circulation methods, where the purpose is to replace fluid in a container. The main problems with fluid circulation to elevated position is:

1. The fluid requires a circulation mechanism to obtain enough energy to overcome the hydrostatic pressure in a liquid and the liquid weight, when moving fluid to an elevated position
2. The fluid circulation must be high. As an example, sea-life containers require high volumes of water due to sea-food content per cubic meter of water. Higher volumes will require more power or less resistance in the flow
3. The fluid circulation needs high elevation. For fluid-containers with sea-animals or vegetative growth in horizontal elevated planes, energy usage must be low and elevation must be high As an example, circulation of fluid to elevated positions in the sea food industry solves many issues, a direct consequence of the inefficient circulation:

1. Transport of sea-animal feed by boat will not be necessary
2. Contamination of the sea-floor due to excrements will be easier to handle in land-based containers
3. Anaerobe conditions due to contaminants, excrements, and the number of sea-animals is easier to handle in contained and controlled environments
4. Transportation of products by boat to markets will not be necessary, as containers of sea-animals may be land-based
5. High energy usage for water purifying systems
6. Sea-animal production and elevated vegetative growth in cities will be much more likely

DISCLOSURE OF THE INVENTION

Problems to be Solved by the Invention

The problems listed below are relating to all known methods of circulation of fluids at elevated heights.
Hydrostatic Pressure and Fluid Weight Elevation will normally create a downward flow if fluid is flowing naturally. Water flows naturally in streams from elevated dams into the sea, due to gravity.

When creating an upward flow, the flow can be considered as a resistive flow where a force is used for the movement of the fluid by opposing the gravitational force. Water has a density of approximately one gram per cubic centimetre, and a force is used to move this water to any given elevation. The definition of the old horsepower unit, indicates that lifting one cubic meter one meter per second will demand much energy. Removing the resistive flow is vital for energy-efficiency, when moving water to an elevated position.

Means for Solving the Problems

The objective is achieved according to the invention by an apparatus for circulation of fluid to an elevated height as defined in the preamble of claim 1, having the features of the characterising portion of claim 1, and a method for circulation of fluids to an elevated height as defined in the preamble of claim 14, having the features of the characterising portion of claim 14.

A number of non-exhaustive embodiments, variants or alternatives of the invention are defined by the dependent claims.

The present invention attains the above-described objective using a plurality of operations with at least one circulation unit to circulate fluid to an elevated height.

Effects of the Invention

The technical differences over the traditional circulation methods are that least one circulation unit is able to circulate fluid in a non-resistive manner to an elevated container, with improved energy efficiency.
These effects provide in turn several further advantageous effects:
- It makes it possible to increase the number of circulation units and thus increase circulation flow
- It makes it possible to dedicate specific circulation units to specific circulation tasks
- It makes it possible to dedicate specific circulation units to specific fluids with different compositions
- it makes it possible to increase the elevated height of the circulation containers with improved efficiency
- it makes it possible to significantly reduce the overall noise due to improved efficiency

BRIEF DESCRIPTION OF THE DRAWINGS

The above and further features of the invention are set forth with particularity in the appended claims and together with advantages thereof will become clearer from consideration of the following detailed description of an exemplary embodiment of the invention given with reference to the accompanying drawings.

FIG. 1A is a detailed illustration of a circulation mechanism, enabling circulation in a circuit FIG. 1B is a detailed illustration of an air evacuation device, evacuating unwanted elements from a circulation system FIG. 1C is a detailed illustration of a collection of pipes creating a conveyor for fluid circulation

FIG. 11 is an illustration of a variation of a circulation unit, where the circulation device is using pressure differences when switching between source and extract, to gain a positive fluid transportation.

FIG. 12 is an illustration of a variation of the closed container who is fitted with a displacement piston to achieve a near 100% displacement, without any mixing of the fluid between the source container and the elevated container

DESCRIPTION OF THE REFERENCE SIGNS

Figure 1:
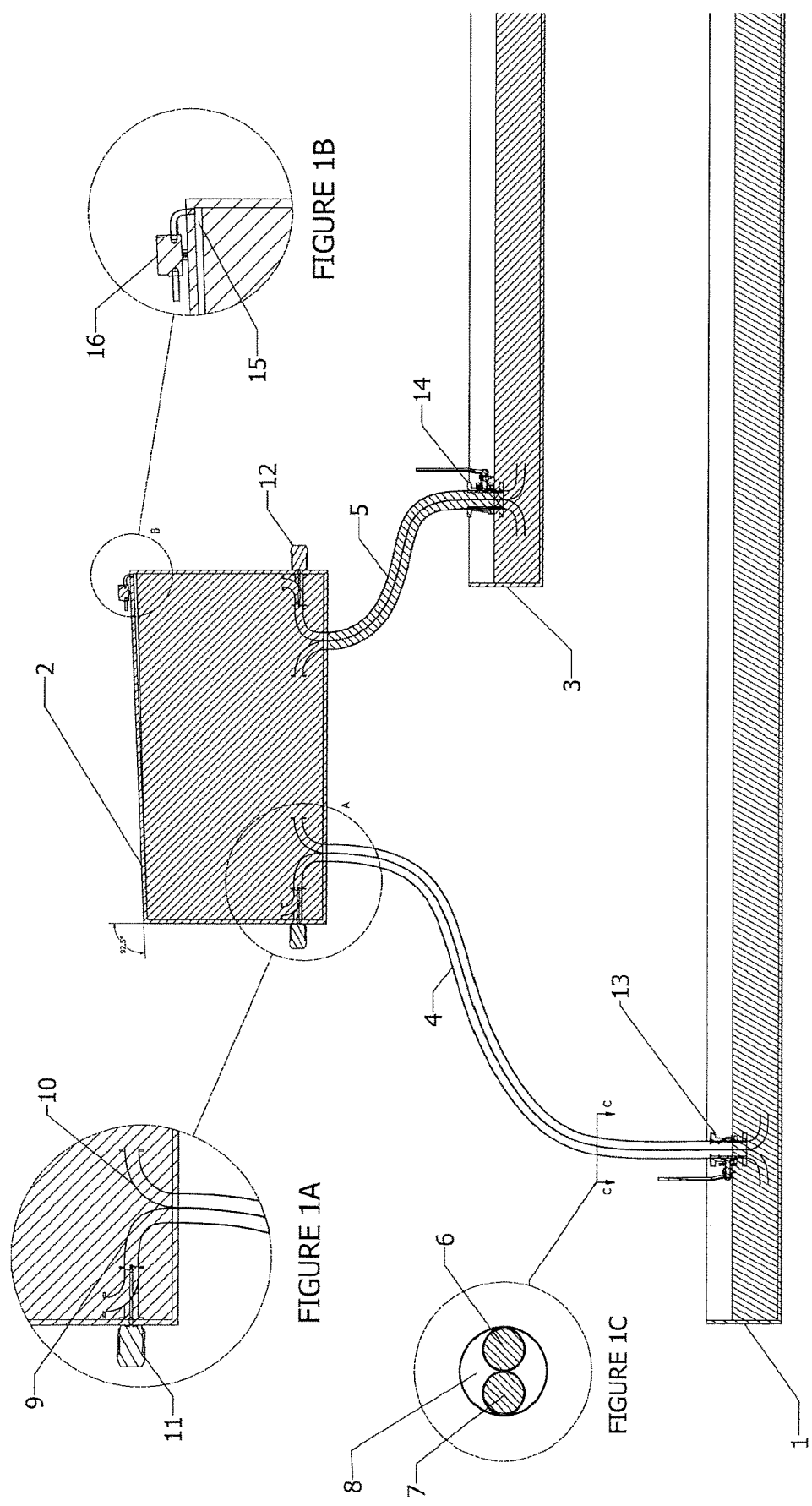
FIG. 1 is an illustration of a circulation system for non-resistive circulation of fluid from a source container to an elevated container

The following reference numbers and signs refer to the drawings:

| | |
|---|---|
| 1 | An open container |
| 2 | An elevated closed container |
| 3 | An elevated open container |
| 4 | A group of pipes for fluid circulation |
| 5 | A group of pipes for fluid circulation |
| 6 | An output pipe for circulation |
| 7 | An input pipe for circulation |
| 8 | Unused pipe area |
| 9 | An input pipe for circulation |
| 10 | An output pipe for circulation |
| 11 | A circulation mechanism, shown as a motor, a shaft and a propeller |
| 12 | A circulation mechanism |
| 13 | A start-stop mechanism, shown as a ball valve |
| 14 | A start-stop mechanism, shown as a ball valve |
| 15 | Contaminants in the fluid, shown as air (bubbles) |
| 16 | An air evacuation mechanism |
| 17 | An open container |
| 18 | A start-stop mechanism, shown as a ball valve |
| 19 | A group of pipes for fluid circulation |
| 20 | A circulation mechanism |
| 21 | An elevated closed container |
| 22 | An air evacuation mechanism |
| 23 | A circulation mechanism |
| 24 | A group of pipes for fluid circulation |
| 25 | A start-stop mechanism, shown as a ball valve |
| 26 | A start-stop mechanism, shown as a ball valve |
| 27 | A group of pipes for fluid circulation |
| 28 | A circulation mechanism |
| 29 | An elevated closed container |
| 30 | An air evacuation mechanism |
| 31 | A circulation mechanism |
| 32 | A group of pipes for fluid circulation |
| 33 | A start-stop mechanism, shown as a ball valve |
| 34 | An open elevated container |
| 35 | An open container |
| 36 | A start-stop mechanism, shown as a ball valve |
| 37 | A group of pipes for fluid circulation |
| 38 | A circulation mechanism |
| 39 | An elevated closed container |
| 40 | An air evacuation mechanism |
| 41 | A circulation mechanism |
| 42 | A group of pipes for fluid circulation |
| 43 | A start-stop mechanism, shown as a ball valve |
| 44 | An open elevated buffer container |
| 45 | A start-stop mechanism, shown as a ball valve |
| 46 | A group of pipes for fluid circulation |
| 47 | A circulation mechanism |
| 48 | An elevated closed container |
| 49 | An air evacuation mechanism |
| 50 | A circulation mechanism |
| 51 | A group of pipes for fluid circulation |
| 52 | A start-stop mechanism, shown as a ball valve |
| 53 | An open elevated container |
| 54 | An open container |
| 55 | A start-stop mechanism, shown as a ball valve |
| 56 | A group of pipes for fluid circulation |
| 57 | A circulation mechanism |
| 58 | An elevated closed container |
| 59 | An air evacuation mechanism |
| 60 | A start-stop mechanism, shown as a ball valve |
| 61 | A group of pipes for fluid circulation |
| 62 | A circulation mechanism |
| 63 | An elevated closed container |
| 64 | An air evacuation mechanism |
| 65 | A circulation mechanism |
| 66 | A group of pipes for fluid circulation |
| 67 | A start-stop mechanism, shown as a ball valve |
| 68 | An open elevated container |
| 69 | A variation illustrating a closed container as the fluid source container |
| 70 | A variation illustrating a closed container as the elevated container |
| 71 | A source container |
| 72 | A start-stop mechanism, a conveyor (pipe) and two circulation mechanisms forming a variation of a circulation function between two containers |
| 73 | An elevated container |
| 74 | A circulation mechanism |
| 75 | A circulation conveyor, shown as a pipe |
| 76 | A start-stop mechanism, shown as a butterfly valve |
| 77 | A conveyor, shown as a pipe |
| 78 | A start-stop mechanism, shown as a butterfly valve |
| 79 | An air evacuation mechanism |

-continued

| | |
|---|---|
| 80 | A start-stop mechanism, shown as a butterfly valve |
| 81 | A conveyor, shown as a pipe |
| 82 | A start-stop mechanism, shown as a butterfly valve |
| 83 | A conveyor, shown as a pipe |
| 84 | A circulation mechanism |
| 85 | Marine life |
| 86 | A conveyor, shown as a pipe |
| 87 | A source container with fluid at density Y |
| 88 | A conveyor, shown as a pipe |
| 89 | A start-stop mechanism, shown as a butterfly valve |
| 90 | A start-stop mechanism, shown as a butterfly valve |
| 91 | A submerged closed container |
| 92 | A start-stop mechanism, shown as a butterfly valve |
| 93 | A start-stop mechanism, shown as a butterfly valve |
| 94 | An air supply for fluid aerating |
| 95 | An aerator |
| 96 | A conveyor, shown as a pipe |
| 97 | A mesh filter |
| 98 | Fluid with a higher density than X (contamination >5u) |
| 99 | A conveyor, shown as a pipe |
| 100 | An elevated container with fluid at density X |
| 101 | Aerator input pipe from the air supply |
| 102 | Aerator input to the conveyor |
| 103 | Clean low-density fluid in an elevated container |
| 104 | High density fluid in an elevated container |
| 105 | A circulation mechanism |
| 106 | A conveyor, shown as a pipe |
| 107 | A start-stop mechanism, shown as a butterfly valve |
| 108 | A conveyor, shown as a pipe |
| 109 | A start-stop mechanism, shown as a butterfly valve |
| 110 | A start-stop mechanism, shown as a butterfly valve |
| 111 | A start-stop mechanism, shown as a butterfly valve |
| 112 | A conveyor, shown as a pipe |
| 113 | A conveyor, shown as a pipe |
| 114 | A circulation mechanism |
| 115 | Low-density fluid in a source container |
| 116 | An elevated extract container |
| 117 | A start-stop mechanism, shown as a butterfly valve |
| 118 | A conveyor, shown as a pipe |
| 119 | An elevated closed container |
| 120 | An air evacuation mechanism |
| 121 | A conveyor, shown as a pipe |
| 122 | A start-stop mechanism, shown as a butterfly valve |
| 123 | An elevated extract container |
| 124 | A height difference, creating a siphon between the extract containers |
| 125 | A source extract container |
| 126 | A start-stop mechanism, shown as a butterfly valve |
| 127 | A conveyor, shown as a pipe |
| 128 | A conveyor, shown as a pipe |
| 129 | A start-stop mechanism, shown as a butterfly valve |
| 130 | An elevated source container |
| 131 | A height difference, creating a siphon between the source containers |
| 132 | A start-stop mechanism, shown as a butterfly valve |
| 133 | A circulation mechanism |
| 134 | A start-stop mechanism, shown as a butterfly valve |
| 135 | A conveyor, shown as a pipe |
| 136 | A conveyor, shown as a pipe |
| 137 | A piston constructed as the tank lid |
| 138 | Compressible gas (air) trapped inside the tank, and piston |
| 139 | A conveyor, shown as a pipe |
| 140 | A conveyor, shown as a pipe |
| 141 | A start-stop mechanism, shown as a butterfly valve |
| 142 | A circulation mechanism |
| 143 | A start-stop mechanism, shown as a butterfly valve |
| 144 | Spring damper |
| 145 | O-rings to ensure a closed elevated container |
| 146 | Compressible gas (air) trapped inside the tank, and piston |
| 147 | Elevated container |
| 148 | Spring damper stand |
| 149 | A start-stop mechanism, shown as a butterfly valve |
| 150 | A start-stop mechanism, shown as a butterfly valve |
| 151 | A conveyor, shown as a pipe |
| 152 | A conveyor, shown as a pipe |
| 153 | Fluid from the elevated container |
| 154 | Fluid from the source container |
| 155 | A conveyor, shown as a pipe |
| 156 | A conveyor, shown as a pipe |
| 157 | A start-stop mechanism, shown as a butterfly valve |
| 158 | A start-stop mechanism, shown as a butterfly valve |
| 159 | A displacement barrier, shown as a perforated plate |
| 160 | A non-friction linear guide |

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Terminology

The exemplary embodiment of this invention is described in connection with the terminology to illustrate that numerous alternatives, modifications and equivalents to the exemplary embodiments are available.

Circulation comprises all forms of movement or flow with a continual change of place among the constituent particles in a matter in a circuit A Circulation Mechanism comprises all forms of mechanisms making circulation possible Flow comprises all forms of particles with a continual change of place among the constituent particles in a matter along a path A Container comprises all methods for containment of matter An elevated container comprises all methods for containment of matter at elevated positions above a zero-reference point A Fluid comprises all forms of matter having particles that easily move and change their relative position without a separation of the mass A start-stop mechanism comprises all forms of mechanisms that prevents or allows the passage of matter A circuit comprises all forms of paths or routes between two or more points in space A conveyor comprises all forms circuits for the transportation of matter along a circuit Maximum elevation limit, is an elevation limit where fluid in a closed container starts to flow in a downward movement due to limitations in equipment or physical laws A non-resistive circulation comprises circulation where the constituent particles in a matter in the circuit is not influenced by resistive forces due to gravity A resistive circulation comprises circulation where the constituent particles in a matter in the circuit is influenced by resistive forces due to gravity A circulation unit is referring to the invention and the principles forming the basis of the invention in FIG. 1

In this disclosure, friction is considered insignificant. Friction in conveyors (pipes) are relative to conveyor-thickness, and with very thick conveyors (pipes) the friction is close to zero and can be neglected. "Non-resistive" is used as a term to emphasize that the invention is "removing" most of the resistive influence from gravitational forces.

Principles Forming the Basis of the Invention

The invention will be further described in connection with exemplary embodiments which are schematically shown in the drawings.

To simplify the exemplary embodiments, water (seawater) is used as a fluid. Similarly, friction forces in the circulation are neglected as resistance in the flow as friction-forces are low compared to the gravitational forces. Friction in pipes is relative to pipe-thickness, and with very thick pipes the friction is close to zero and can be neglected. All start-stop mechanisms throughout the description are specified as valves (ball-valves), and all circulation conveyors are specified as pipes. These mechanisms are most common in circulation systems, and are schematically shown in the drawings.

The invention is using a principle where hydrostatic system is created. Pascal's law specifies that a change in pressure at any point in an enclosed fluid at rest is transmitted undiminished to all points in the fluid. If the pressure changes within a circulation device at a conveyor-intake, it will create the same pressure at the conveyor-outlet.

An important feature is that the intake and outlet is at the same level (pressure level). The principles forming the definition of Power (with SI-unit watt), indicates that energy will be used by creating movement, and if this movement is at the same level (height), energy will only be used to create movement. Frictional forces in the movement are the only opposing forces. If the movement of the mass is not at the same level, energy is used to oppose the gravitational force created by the level difference. The energy may also be extracted from the level difference, by using a siphon as a circulation device, where the energy will be depleted from the kinetic energy at the higher level.

When referring to levels, the depth below container surface is not considered. If the conveyor-intake is at an increased depth compared to the conveyor-outlet it will not influence the system. The pressure difference due to different fluid-columns will even out the influence of the water column in the conveyors, and will not cause any flow.

But the gravitational force is significant, and will create an un-even pressure if the conveyor-intake and conveyor-outlet is at different surface-levels. The water column will differ, and initiate a flow to the lower level. This is a well-known principle; a siphon.

If the conveyor-intake and conveyor-outlet is at different levels, energy usage may be increased to compensate for the difference in pressure. A traditional centrifugal pump must create a pumping pressure at 10000 pascal (0.1 Bar) when moving water 1 meter upwards. This problem is solved by ensuring that the inlet and outlet is at same hydrostatic pressure level; the source surface or the elevated container surface.

Since the circulation unit is not adding or removing fluid in the circulation, the only energy needed, is to establish circulation (movement).

Initially the system illustrated in FIG. 1 is filled with fluid. All start-stop mechanisms 13, and 14 are closed and circulation units 11 and 12 is stopped. In the example shown, the start-stop mechanisms 13 and 14 cannot be open at the same time. If valve 13 is opened and valve 14 is closed, the hydraulic system will be at rest without any flow from container 2 to the source container 1. Similarly, if valve 14 is opened and valve 13 is closed, the hydraulic system will be at rest without any flow from container 2 to the elevated container 3. If both valves are open, the hydraulic system is not at rest and the fluid will flow from the elevated container 3 to the source container 1.

By applying circulation with the circulation device 11 it is possible to obtain a non-resistive circulation from an open source-container 1, into a closed container 2 when the valve 13 is open and the valve 14 is closed.

Similarly, the circulation device 12 is circulating water from the closed container 2 to the elevated container 3 in a non-resistive manner, when the valve 13 is closed and valve 14 is open.

The basis of the invention is solving the problem with hydrostatic pressure, and fluid weight by introducing non-resistive circulation.

Increases in Circulation Volume

Figure 2:
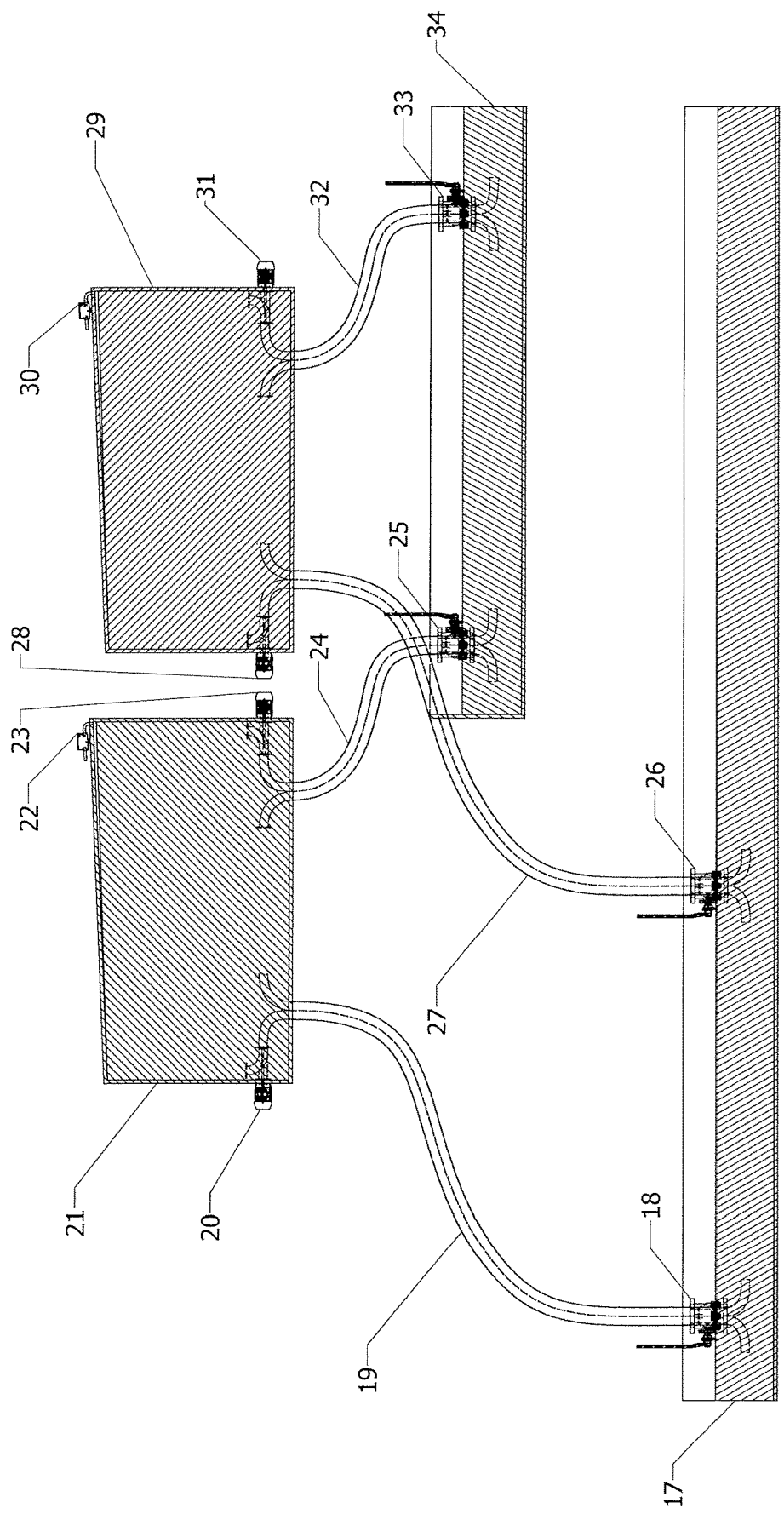
FIG. 2 is an illustration of a plurality of non-resistive circulation units connected in parallel to increase functionality and enable uninterrupted increased flow

A circulation system as illustrated in FIG. 2, solves the problem that arises when you need to increase flow with a non-resistive circulation.

Increasing the circulation volume to an elevated container would increase energy consumption.

Increasing volume by multiplication, will roughly increase the energy usage by the same multiplier when transporting fluid to an elevated container.

This problem is solved by introducing a plurality of circulation units connected in parallel. A non-resistive circulation is performed by a circulation unit, and the efficiency gained by this methodology may be multiplied with a plurality of circulation units connected in parallel. It would be possible to increase pipe-diameters and get similar results, but will limit the maximum elevation limit due to hydrostatic pressure and the weight of water. Elevated height may be more vital than pipe-diameters.

This method will introduce increases in flow, in a non-resistive manner.

Increasing Elevation

Figure 3:
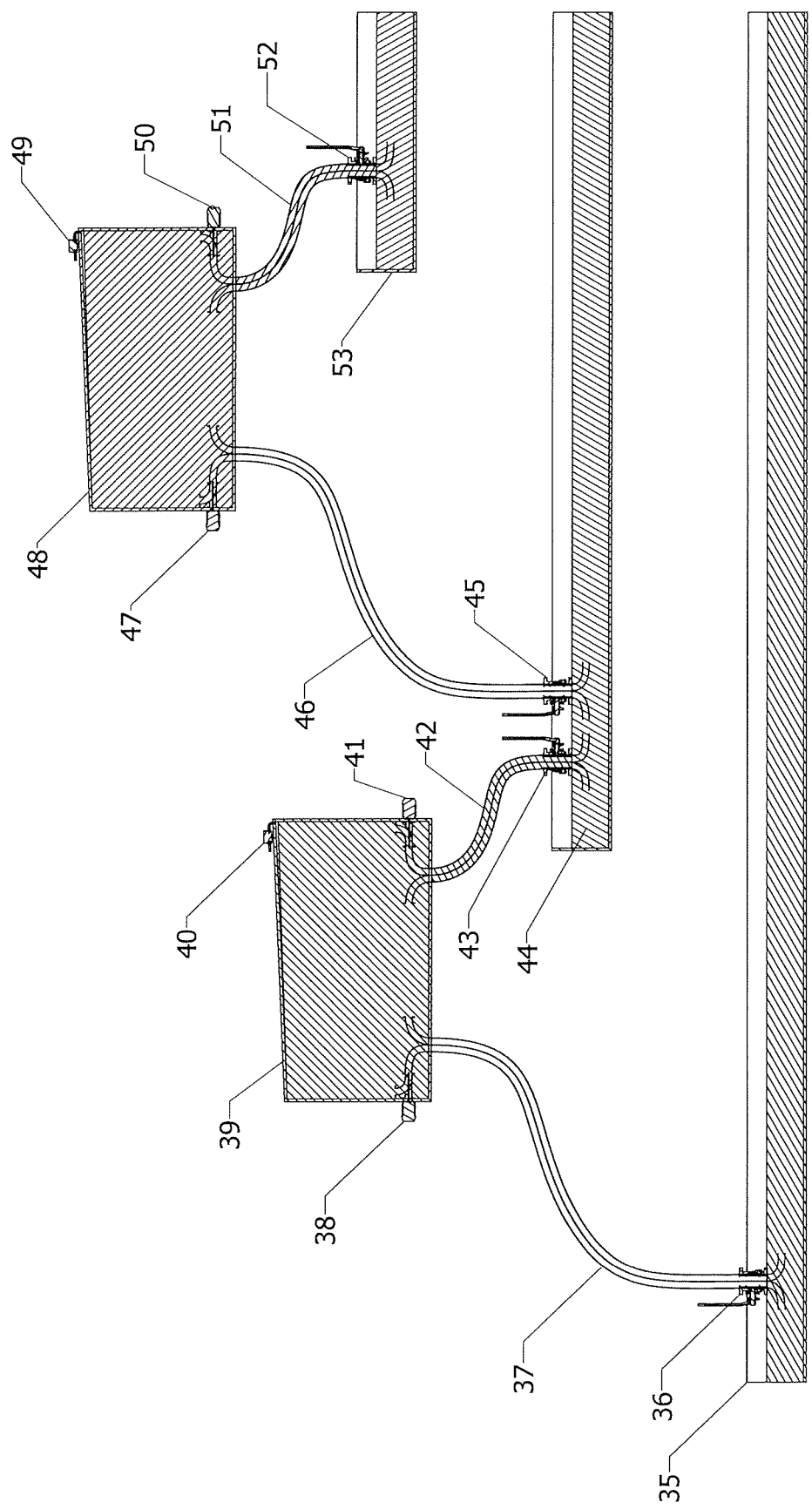
FIG. 3 is an illustration of a plurality of non-resistive circulation units connected in series to enable increased elevated height

An efficient way of creating a non-resistive fluid circulation is illustrated in FIG. 3, where it is possible to increase elevation to extreme levels. This is done by connecting a plurality of circulation units in series.

Hydrostatic pressure creates limitations on the elevation, due to limitations on materials and equipment when subjected to high pressure.

This is normally solved by using high-pressure pumps and high-pressure equipment, but this method is a resistive circulation and is inefficient.

By subdividing the pressure-levels into smaller elevations it is possible to obtain a non-resistive circulation of fluid from source container 35 to the elevated container 53, shown in FIG. 3.

The circulation system shown in FIG. 3, solves the problem with fluid circulation at extreme elevation, by using a plurality of circulation units connected in series.

FIG. 1 illustrates a circulation unit used to circulate fluid from container 1 to the closed container 2, when the valve 13 is open, and the valve 14 is closed. When the circulation mechanism 11 has replaced the fluid in the container 2 with fluid from the source container 1, the valve 14 is opened, and the valve 13 is closed. The circulation device 12 will replace the content of container 2 with fluid in the elevated container 3.

Initially the system is filled with fluid as shown in the illustration and all start-stop mechanisms 13 and 14 are closed and circulation mechanisms 11 and 12 are stopped. In the example shown in FIG. 1, the valve 13 and 14 cannot be open at the same time. If valve 13 is opened and valve 14 is closed, the hydraulic system will be at rest without flow from container 2 to the source container 1. Similarly, with valve 13 closed and valve 14 open, the hydraulic system will be at rest without flow from container 2 to the elevated container 3.

The hydrostatic pressure created by the container 2 and the pipes 4 will limit the maximum elevation due to physical limitations on the equipment and physical laws. This limit is specified as the "maximum elevation limit", where the hydraulic system is not at rest, and fluid will start to flow in a downwards movement. This limit will differ for different fluids, or in different operating conditions.

FIG. 1A is a detailed illustration of an axial propeller pump motor 11. The circulation mechanism is enabling circulation between container 2 and container 1. The circulation replaces fluid in the container 2 with fluid from the open container 1 through the input-pipe 9(7) and outputs the fluid through the pipe 10(6). Similarly, the circulation device 12, will enable circulation in the pipes 5, between container 2 and container 3.

If the valve 13 is open, and the circulation mechanism 11 is started the fluid will circulate between the open container 1, and the closed container 2. The hydraulic system was initially at rest, and the circulation mechanism will create a change in pressure that is transmitted undiminished to all points in the fluid. Low pressure circulation is energy-efficient.

FIG. 1B is a detailed illustration of an evacuation device 16 removing contaminants 15 that may affect the "maximum elevation limit". When the evacuation device 16 removes contaminants 15, it may replace the contaminants with fluid used in the circulation. The evacuation device 16 may separate the inside and the outside of the container 2, so that the closed container 2 is forming a closed system.

Evacuation devices may be placed in other locations with different purposes, depending on what kind of elements is needed to be evacuated from the closed container 2. The preferred operation is to evacuate unwanted elements from the fluid that influences the circulation in negative ways or reduces the maximum elevation limit. In the example shown, the evacuation device 16 is used for evacuation of air 15.

FIG. 1C is a detailed illustration of a section of the pipe 4 containing two pipes, circulation input 7 and circulation output 6. In the example shown, the area 8 in the pipes is closed. The hydraulic pressure from the circulation device will be divided equally in areas 6, 7 with opposite values. When the valve 13 is open and the valve 14 is closed, the pipes form a hydraulic circuit at rest, until it is influenced by the force (pressure) created by the circulation device 11 in FIG. 1A.

If an extra circulation device is introduced in the output pipe 10(6), the area 8 in the surrounding pipe 4 may be operated as a differential circuit. If the input pipe 9(7) flow is higher or lower than the flow in the output pipe 10(6), the difference is handled by the circuit created by area 8. Any configuration of the pipes is possible as long as the start-stop mechanisms are able to open and close the circulation as intended. Collecting the pipes as shown in FIG. 1C, may be better due to traditional start-stop mechanisms like ball-valves.

The location of the pipes inside the closed container 2 is depending on the preferred fluid for circulation, removal of contaminants etc. In the example shown, where water is used as fluid, the extract pipes 5 would be more optimal if they were horizontally positioned on the left side of the closed container 2. Then there would be less hydrostatic pressure when the valve 13 is closed and valve 14 is open. The pipes 5 may be as short as possible to create a more optimal circulation.

Figure 5:
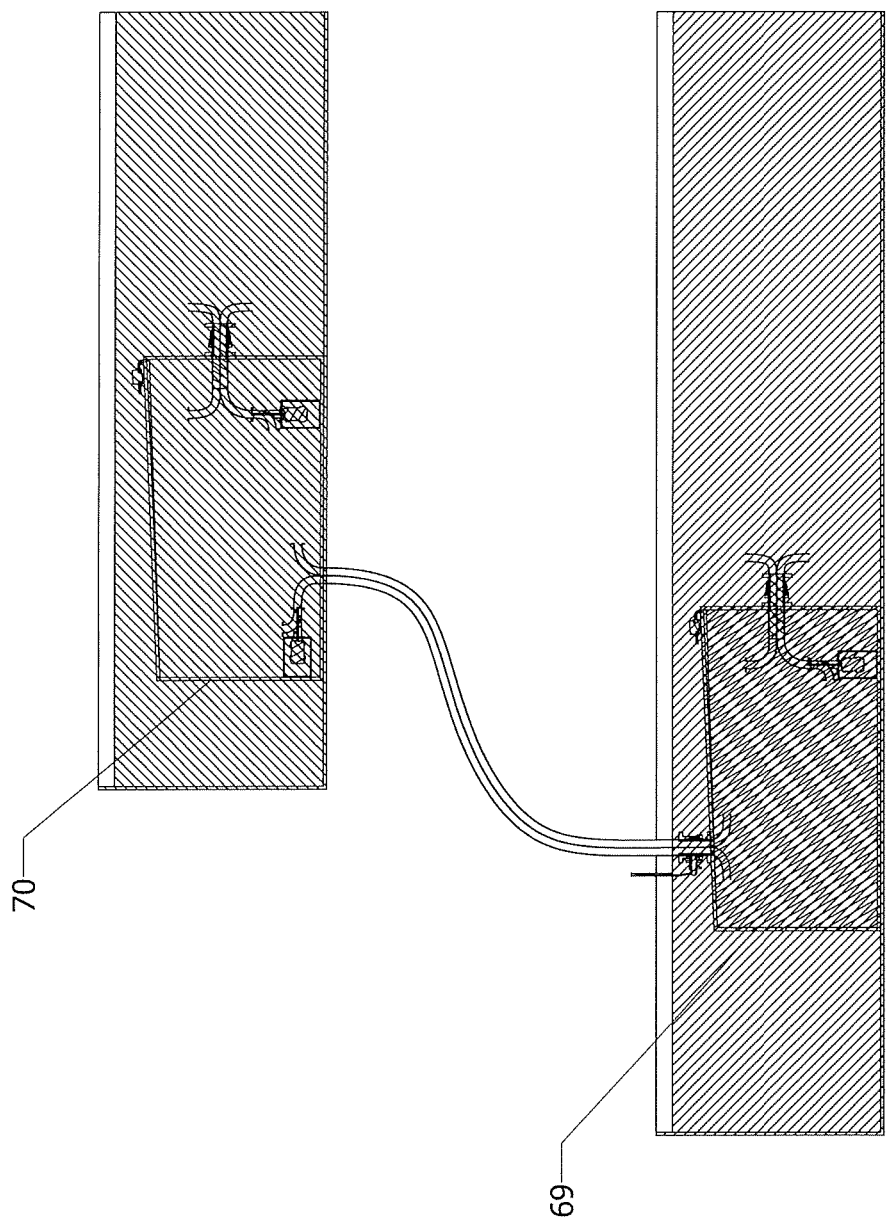
FIG. 5 is an illustration of a variation of a non-resistive circulation unit, where the closed containers are submerged to increase maximum elevation limit

The location of the closed container 2, may be submerged in the fluid in the elevated container 3 (shown in the alternative embodiment in FIG. 5, 70). This will simplify the evacuation of contaminants or air, and be more optimal with regards to elevation and circulation. Additionally, the source container could also be a closed container as shown in the alternative embodiment in FIG. 5, 69. This optimization may increase maximum elevated height. But the illustrations are exemplary, and the preferred location of pipes and containers, may change if the fluid differs from water, or more optimal circulation parameters are needed.

Figure 4:
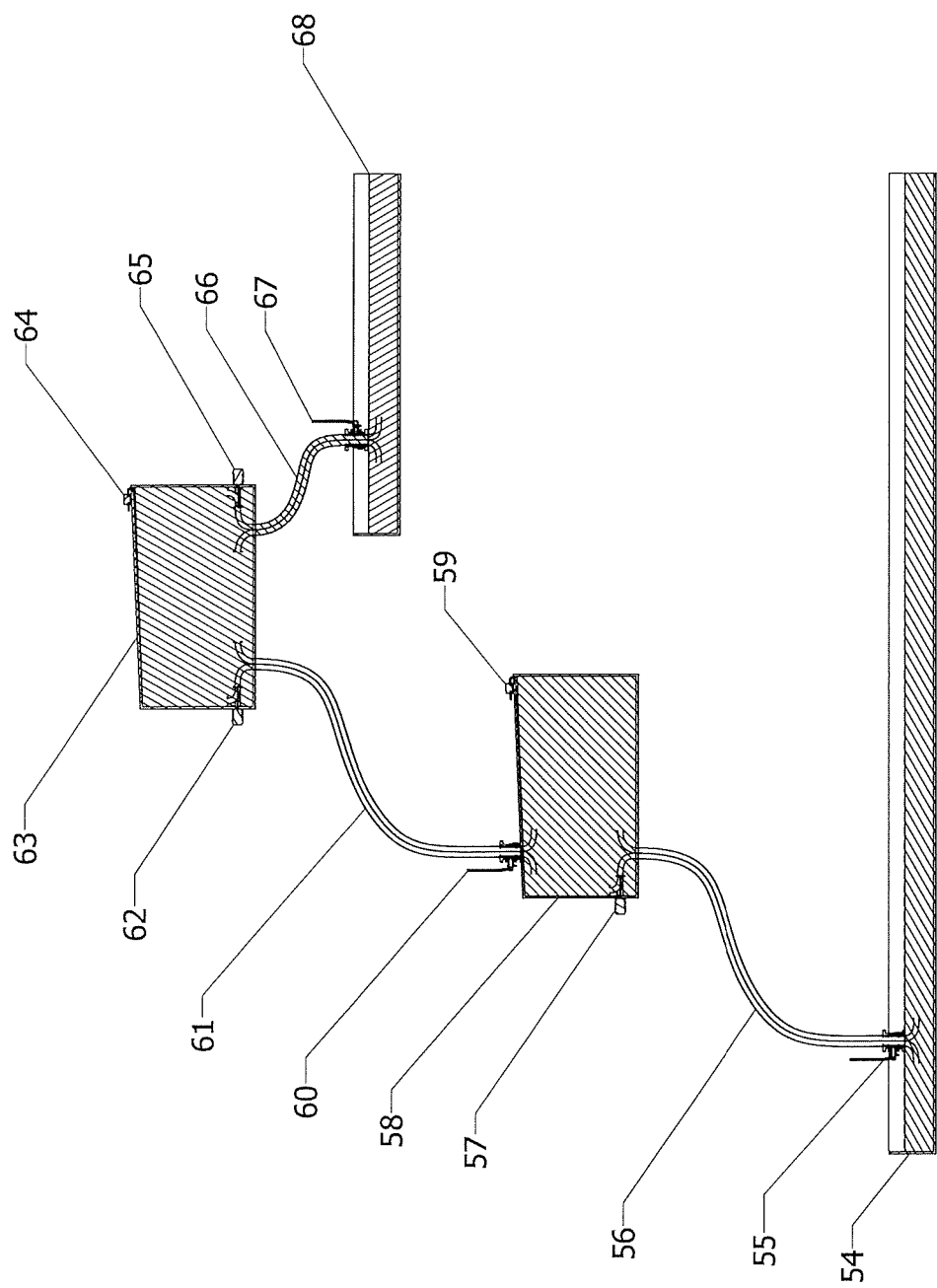
FIG. 4 is an illustration of a variation of a plurality of non-resistive circulation units connected in series to enable increased elevated height

FIGS. 2, 3 and 4 show how parallelly and serially connected circulation units may be formed. FIGS. 2 and 3 show the basic circulation unit (FIG. 1), connected in parallel and in series. FIG. 4 is a variation of the serially connected circulation units in FIG. 3.

The parallel connected circulation units will increase flow, while the serially connected circulation units will increase elevation, in a non-resistive manner without reducing the efficiency of the circulation system Parallelly and serially connected circulation units, may also introduce additional functionality. They may contain fluids of different compositions, and have different locations in the system.

Similarly, containers may represent additional functionality. A plurality of containers may represent fluids with different composition. In the exemplary embodiment, the source container and elevated container are shown as single containers. If they represented a plurality of containers and different circulation units was used in parallel, the functionality of the system may increase considerably. As an example, if contaminants are present in the bottom of one elevated container, a circulation unit could be used to remove the contaminants to a separate source container, as shown in the alternative embodiment in FIG. 9. This is indicating that plurality of functions may be separated by containers and a plurality of parallelly and serially connected circulation units. By using elevated buffer containers 44 (FIG. 3), the functionality may be increased further by introducing a plurality of elevated (open or closed) buffer-containers.

The valves 13 and 14, are start-stop mechanisms and may be of any form long as they are able to close the conveyors (pipes), and close the circulation circuit. Due to air in the fluid or other contaminants influencing hydrostatic pressure, the location may be as low as possible. Other configurations and embodiments of the number of valves and their location may be envisaged if they increase the maximum elevation limit. The valves may be combined to one start-stop mechanism, with one input in container 2, and two outputs to container 1 and 3, so that one input operates one output at the time. Two separate valves are used to simplify the illustration and the description of the innovation.

Again, it is vital that the system is a closed system. If one of the valves 13 and 14 is open and the other is closed, the system is closed. If both valves 13 and 14 is open at the same time, the system is open, and the fluid will start to flow from the elevated container 3 down to the source container 1. To maintain a hydraulic system at rest, electronic monitoring and control may be implemented. Start-stop mechanisms, circulation mechanisms and evacuation mechanisms may be controlled and monitored electronically. Additionally, sensors to monitor flow in the pipes (4 and 5), and contaminants in the containers (1, 2 and 3) may be implemented to monitor and control the sequences of the circulation units, so that the maximum elevation limit is not affected. The electronic control system must be able to monitor if the system is a closed hydraulic system, to allow a non-resistive circulation and prevent downward flow.

Although the foregoing embodiments have been described in some detail for purposes of clarity of understanding, the invention is not limited to the details provided. There are many alternative ways of implementing the invention. The disclosed embodiments are illustrative and not restrictive.

Best Modes of Carrying Out the Invention
Best Mode of Operation for a Basic Circulation Unit:

FIG. 1 illustrates a non-resistive circulation of fluid from the source container 1 to an elevated container 3.

Prior to operation container 2 and pipes 4 and 5 must be filled with liquid. This may be done by the air evacuation device 16, either by means of a vacuum or a combination of water injection and evacuation through pumping or circulation. All valves are closed and circulation devices are stopped, prior to the operation.

Initially, the valve 13 opens, and the water inside the container 2 and the hydrostatic pressure created by the fluid in the pipes 4 will not allow any flow from the container 2 into the source container 1. This gives us a hydraulic system at rest, where there is no flow from container 2 to the source container 1. Pascal's law specifies that a change in pressure at any point in an enclosed fluid at rest is transmitted undiminished to all points in the fluid.

The circulation unit shown in FIG. 1 may be grouped in circulation circuits for simplification:
Supply 1, containing the valve 13, the pipes 4 and the circulation device 11
Extract 1, containing the circulation device 12, the pipes 5 and the valve 14

The circuit is closed when the circulation device is stopped and the valve is closed, and the circuit is open when the circulation device is started and the valve is open. The Supply unit cannot circulate at the same time as an Extract unit, so that the closed container 2 is forming a closed system.

Circulation from the source container 1 to the elevated container 3 is performed by opening the Supply unit, and closing the Extract unit. After an optimal circulation, the Supply unit will close and the Extract unit will open. After an optimal circulation the fluid in the elevated container 3 have been replaced by fluid from the closed container 2.

If evacuation of unwanted elements in the container 2 is needed, both Supply and Extract is closed until the evacuation is finished.

The flow in the circulation between the source container 1 and the elevated container 3 is not continuous. The Extract and Supply cannot operate at the same time.

The mechanisms described provides fluid circulation in a non-resistive manner to an elevated height. Energy is only used for circulation, and the resistive motion through the pipes.

Best Mode of Operation Based on a Plurality of Parallelly Connected Circulation Units:

FIG. 2 illustrates how a variation of the invention may increase circulation flow by combining several circulation units (from FIG. 1) in parallel.

The system shown may be grouped in circulation circuits for simplification:
Supply 1, containing the valve 18, the pipes 19 and the circulation device 20
Extract 1, containing the circulation device 23, the pipes 24 and the valve 25
Supply 2, containing the valve 26, the pipes 27 and the circulation device 28
Extract 2, containing the circulation device 31, the pipes 32 and the valve 33
A Supply circuit cannot circulate at the same time as an Extract circuit
System 1, is containing Supply 1 and Extract 2
System 2, is containing Supply 2 and Extract 1

The circuit is closed when the circulation device is stopped and the valve is closed, and the circuit is open when the circulation device is started and the valve is open. The Supply unit cannot circulate at the same time as an Extract unit on the same circulation unit, so that the closed containers 21 and 29 are forming a closed system.

To obtain circulation from the source container 17 to the elevated container 34, the parallel operation will create a continuous flow if the elements in System 1 are open, while the elements in System 2 are closed. Similarly, when the elements in System 1 are closed and elements in System 2 are open.

Circulation may represent a dilution of fluids with different purities, and parallelly connected circulation units will spread this effect parallelly.

Adding multiple units in parallel will create uninterrupted increase in flow, in a non-resistive manner. Parallel operations may separate functionalities for each system, if the location, content and purpose of each unit changes.

Best Mode of Operation Based on a Plurality of Serially Connected Circulation Units:

FIG. 3 illustrates a variation of the invention that increases elevation by combining several circulation units in series.

Hydrostatic pressure is a function of the height between the source container and the elevated container. A system of serially connected units will solve any unnecessary increases in hydrostatic pressure. Each serially connected unit will operate below the maximum elevated height.

The system may be grouped in circuits for simplification:
Supply 1, containing the valve 36, the pipes 37 and the circulation device 38.
Extract 1, containing the circulation device 41, the pipes 42 and the valve 43.
Supply 2, containing the valve 45, the pipes 46 and the circulation device 47.
Extract 2, containing the circulation device 50, the pipes 51 and the valve 52.

The circuit is closed when the circulation device is stopped and the valve is closed, and the circuit is open when the circulation device is started and the valve is open. The Supply unit cannot circulate at the same time as an Extract unit on the same circulation unit, so that the closed containers 39 and 48 are forming a closed system.

The circulation units are connected to an open buffer container 44, and may operate separately, similarly to the basic circulation unit. The flow of a serially connected system will be interrupted by the start-stop mechanisms.

Circulation may represent a dilution of fluids with different purities. Serially connected circulation units will spread this effect serially.

The configuration will remove problems with high hydrostatic pressure at high elevations. Each serially connected circulation unit will circulate in a non-resistive manner.

Best Mode of Operation Based on a Plurality of Serially Connected Circulation Units without Open Buffer Containers:

FIG. 4 illustrates a variation of the invention that increases elevation by combining several circulation units in series.

The illustration shows that the circulation in one container is depending on the preceding container.

This variation will not need open elevated containers, but each unit is depending on the valve in the succeeding container.

The succeeding valve must be closed for the preceding unit to operate properly.

The system may be grouped in circuits for simplification:
Supply 1, containing the valve 55, the pipes 56 and the circulation device 57.
Supply 2, containing the valve 60, the pipes 61 and the circulation device 62.
Extract 1, containing the circulation device 65, the pipes 66 and the valve 67

The Supply 1 is replacing the fluid in the container 58, with fluid from the source container 54. Supply 2 is closed during this operation.

When Supply 1 is closed, Supply 2 is open and is circulating the fluid in the container 63 with the fluid in container 58. The Extract 1 is stopped during this operation. The last operation is performed when Supply 2 is stopped, and both Supply 1 and Extract 1 may circulate.

Extract 1 is circulating the content of container 63 with the elevated container 68.

Circulation may represent dilution of fluids with different purities. Serially connected circulation units will spread this effect serially.

The variation does not need elevated open buffer containers, and multiple units may be designed in a serially connected string for fluid circulation to extreme elevated heights.

Best Mode of Operation Based on a Plurality of Serially and Parallelly Connected Circulation Units:

The invention is shown in different embodiments, where the basic unit illustrated by FIG. 1, is connected as a plurality of units in series or in parallel in FIGS. 2, 3 and 4.

A plurality of parallelly and serially connected circulation units, connected by a plurality of containers, are not shown in the illustrations but may be constructed to optimize the functionality further.

In mathematics, serially and parallelly connected devices introduces Boolean algebra, and a plurality of parallelly and serially connected devices may create functions that produces optimal non-resistive circulation to elevated containers in any way or form.

The complexity of operating parallelly and serially circulation units will introduce some form of control system and electronically controlled start-stop sequences. A control system, may monitor the system so that the elevated container stays below maximum elevation limit, to prevent downwards flow from the elevated container to the source container.

The best mode of operation for such a system is similar to the serially and parallelly connected units, but where the functionality is multiplied in a computer-controlled system.

Solving how to Perform a Non-Resistive Circulation at Elevated Height

It has been shown in the exemplary embodiments, that by using principles to establish a hydraulic system at rest and introduce non-resistive circulation, it is possible to circulate of fluids to elevated positions with high efficiency.

The invention is depending on a sequential control of start-stop mechanisms and circulation mechanisms, so that the system forms a closed system for a non-resistive circulation.

Solving how to Create an Uninterrupted Increase in Flow

It has been shown in the example, that by connecting non-resistive circulation units in parallel, we have been able to create a non-resistive and non-interrupted increase in flow.

This may solve problems where increases in volume will increase energy consumption linearly, relative to the volume of the fluid.

Solving Increases in Elevation

It has been shown that by connecting multiple circulation units in series, the elevation may be multiplied with high efficiency.

This may solve problems where increases in height will increase energy consumption linearly, relative to the elevated height.

Alternative Embodiments

A number of variations may be envisaged.

Variation 1

It is envisaged in FIG. 5 that the circulation units are submerged in the source container and the elevated container. This creates a closed source container and a closed elevated container, increasing the elevated height limit for the system. This may be advantageous both for small inexpensive systems and systems where it is possible to reduce the number of serially coupled buffer containers to achieve very high elevations with high energy efficiency.

Variation 2

Figure 6:
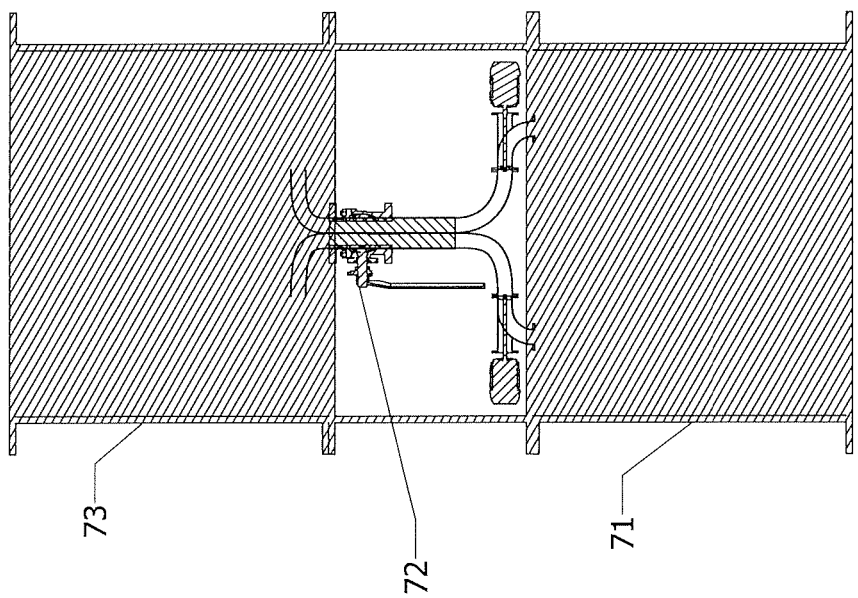
FIG. 6 is an illustration of a variation of a circulation unit, where the circulation device, pipes and valves form a circulation function between two closed containers

Another variation of the invention is illustrated in FIG. 6, where circulation units are connected in series, but without open elevated circulation containers. A serially coupled variation is a cost-efficient variation for circulation to higher elevations.

Variation 3

It is also envisaged in FIG. 6 that the start-stop mechanism, circulation mechanism and conveyors are combined to form a transfer function for the circulation between two containers. These may be multiple stacked units so that they form a pipe of containers with transfer functions in between. This is a variation of the serially coupled circulation unit shown in FIG. 4.

Variation 4

Figure 7:
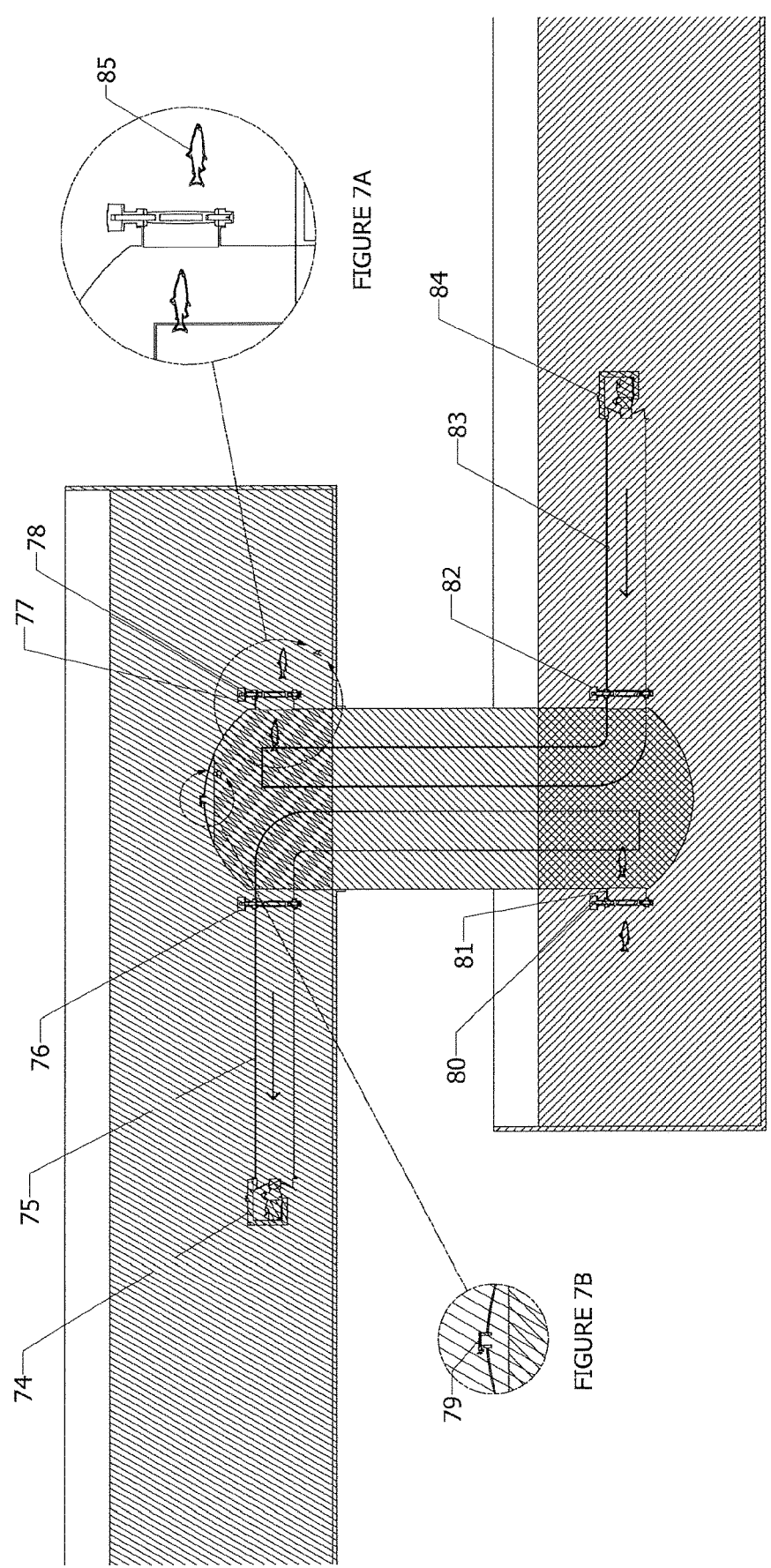
FIG. 7 is an illustration of a variation of a circulation unit, where the circulation device is used for transportation of marine life, and where the tube-distances increases efficiency in the fluid displacement.

It is also envisaged in FIG. 7 that the invention is used for transfer of fish between a source container and an elevated container. FIG. 7 slightly differs from previous illustrations, and introduces two valves 76, 78 on the extract circulation circuit and two valves 80, 82 on the source circulation circuit. Consequently, when operating the source circuit, both extract valves must be closed while the source valves are open. Similarly, when operating the extract circuit, both source valves must be closed when the extract valves are open. An additional difference is the pipes 75,83 that extends inside the closed container, and provides a more optimal displacement of the fluid in the tank when the source or extract circulation occurs. The circulation devices 74,84 is standard recirculation pumps. The closed container is standing between the source and the extract container, creating a vacuum when the source valves 80, 82 is open. This might negatively impact marine life. The directional arrows in the circulation devices 74,84 indicates the source and extract flow direction, to indicate that fish normally swim against the current, defining the transportation direction. The direction can be reversed, or an additional unit can be installed parallelly for the transfer of fish (marine life) in the other direction.

Fish production, especially salmon production is troubled by salmon louse. The normal reaction for an infected salmon is to seek fresh water sources. One of the containers may be a fresh water container and may also be used for feeding, so that the fish is periodically exposed to fresh water where the salmon louse cannot survive. The variation of the invention can also prevent salmon louse by collecting water with one of the source pipes 81,83 at a depth below the salmon louse habitat.

Variation 5

Figures 8, 8A:
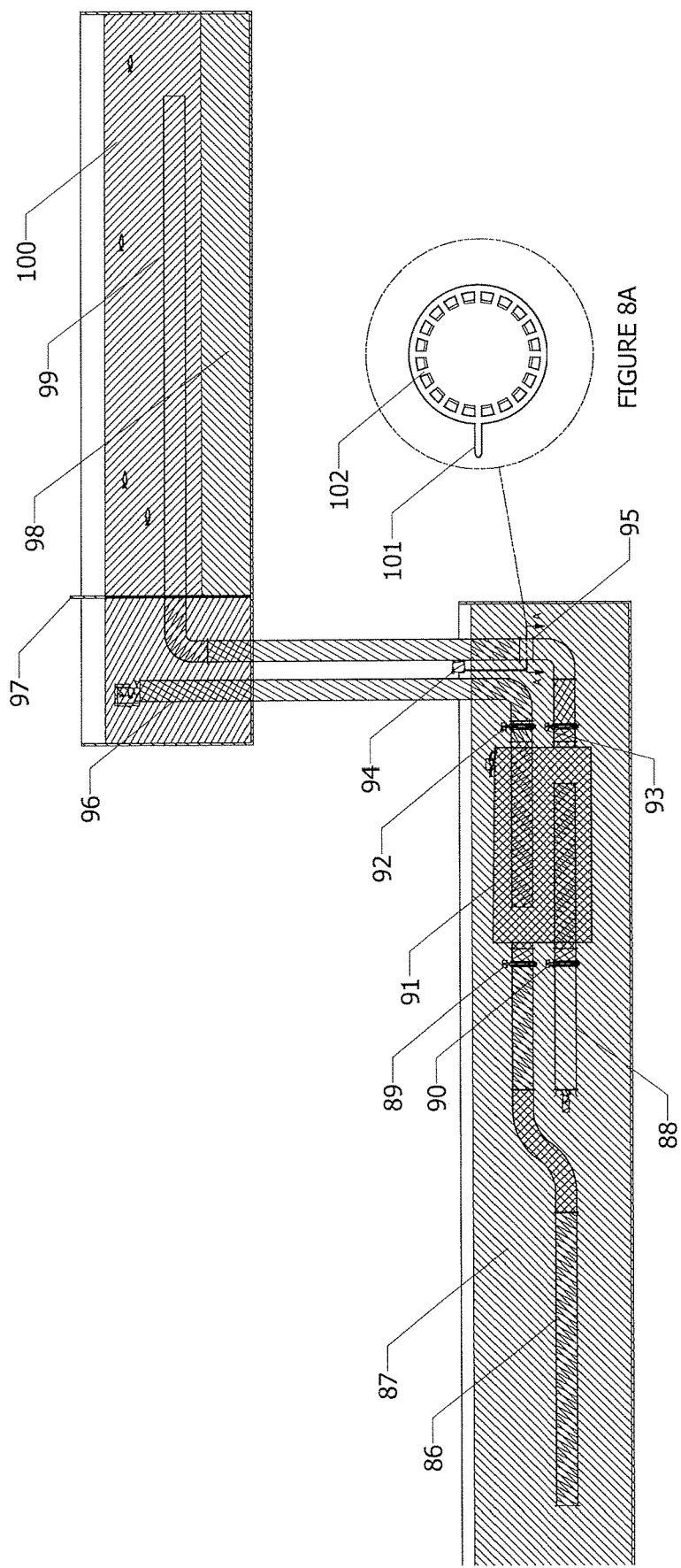
FIG. 8 is an illustration of a variation of a circulation unit, where the circulation device is a pressurized tank that increases the maximum elevated height and where the fluid has different densities and contaminations.

It is also envisaged in FIG. 8 that the invention can be used in the source container alone, to avoid vacuums that may not be desirable for marine life. This can in effect also increase elevated height. It is shown in this variation that the source circulation circuits 86,88 have an increased distance from each other so that the fluid circulation from a potentially contaminated elevated container is not mixed with the source fluid. The distance can be increased further for increased effect. Similarly, the distance between the extract circulation circuits 96,99 will improve displacement of the fluid in the tank for the circulation unit.

The aerator shown in FIG. 8A, show an input air-pipe 101 distributing air from an air pump 94 in a circular tube with air-intake into the circulation conveyor 102. Aerators are known to reduce the density of water, and may provide a positive lift. If the fluid with density Y 87 is higher than the fluid with density×100 in the elevated container, an aerator can offset the pressure difference that may occur between fluids of different density and weight.

A mesh filter 97 is inserted into the elevated container to illustrate a separation of fluids with contamination with particles such as marine excrements or other types of contamination with a certain particle size. In the illustration a particle size of 5 micron is used. In the exemplary embodiment this filter is assumed to have a higher flow rate than the flow rate provided by the circulation devices. The effect of such a filter may not influence the circulation device and the non-resistive circulation.

The variation can replace the transportation of marine life (fish), as envisioned in FIG. 7. The device may be more applicable due to the lack of vacuum. Marine life is adapted to pressure and depth, but less adapted to pressures lower than atmospheric pressures.

Variation 6

Figure 9:
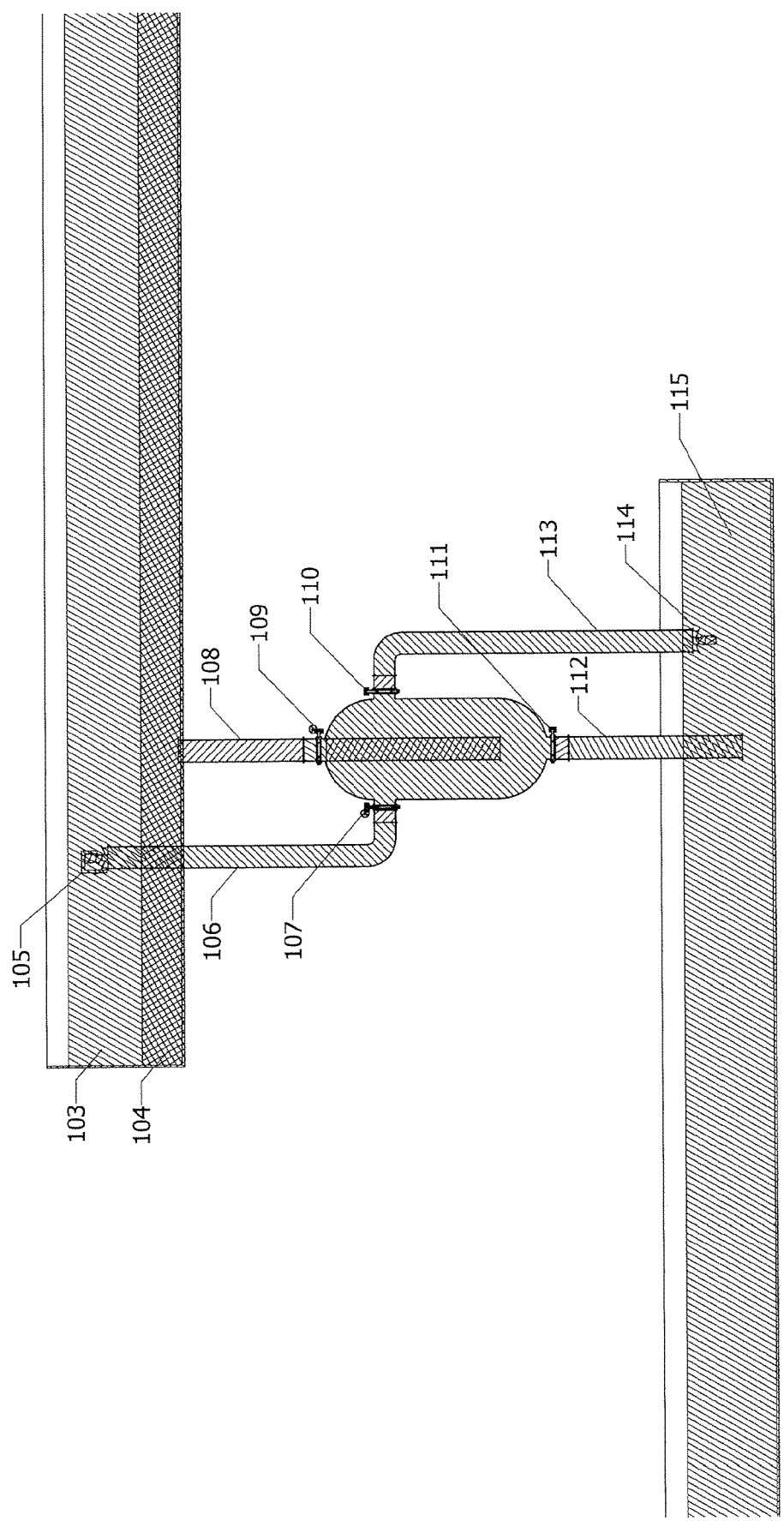
FIG. 9 is an illustration of a variation of a circulation unit, where the circulation device is using differences in fluid density to increase fluid circulation efficiency.

It is also envisaged in FIG. 9 how it is possible to remove contaminated and high-density fluids from an elevated container by using the increased weight provided by the fluid with higher density. The circulation devices 105, 114 may not be necessary to provide a circulation because the high-density fluid provide extra weight and will move downwards and may provide a positive circulation without the circulation devices 105, 114. Because of this effect, the circulation devices 105, 114 may be included to speed up the process of transporting contaminated (high density) fluids away from an elevated container, but at increased efficiency. Marine life (fish) may be a source of contamination and the device may be used in combination with the envisioned variation provided in FIG. 8.

Variation 7

Figure 10:
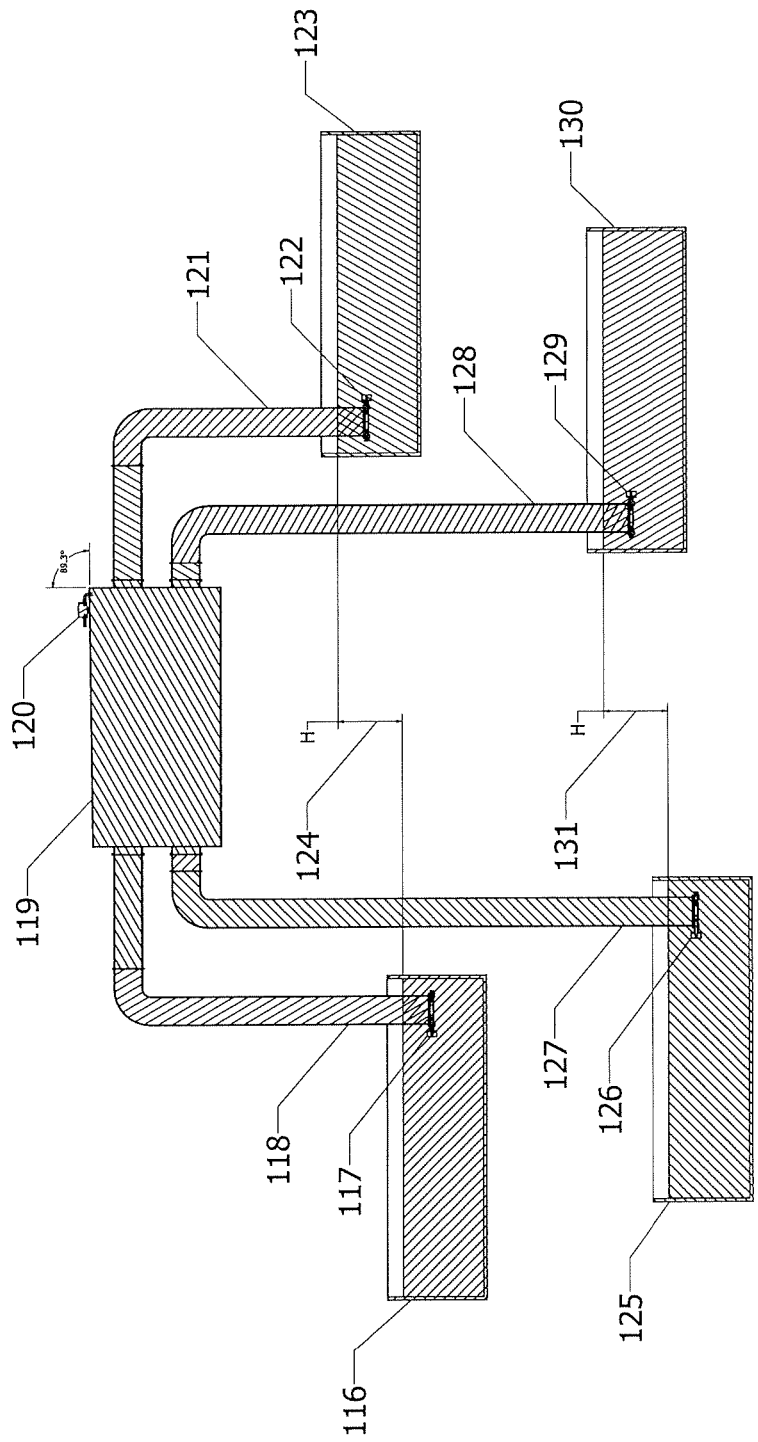
FIG. 10 is an illustration of a variation of a circulation unit, where the circulation device is using the siphon-effect as the circulation mechanism.

It is also envisioned how the Siphon principle may be used instead of pumps to circulate fluids to elevated containers in FIG. 10. The source circulation conveyors 127, 128 and the source circulation start-stop mechanisms 126, 129 is circulating fluid from the elevated container 130 to the container 125 due to the siphon principle. The height 131 is causing fluid to flow in the supply conveyors 128,127 and the height 124 is causing the fluid to flow in the extract conveyors 121, 118. The closed container 119, will contain fluid from the container 130. When the start-stop mechanisms 126,129 in the source circulation is closed, and the start-stop mechanisms 117, 122 is open, the extract circulation is displacing and moving the fluid from the source container 130, to the elevated container 116, thus circulating water to an elevated container solely based on the siphon principle. In this process the fluid in the elevated container may be a mix of fluid from the source container 129 and the elevated container 122 depending on how the displacement of fluids are controlled.

Variation 8

It is also envisaged in FIG. 11 how the non-resistive circulation device can be used to have a net positive transportation of fluid to an elevated container. Because any circulation will involve increases in pressure, the elevated container may use air or a compressible gas inside the closed elevator 138, 146 as a damping element. The elevated closed container consists of a container with the top part working as a piston 137, with piston seal rings shown in FIG. 11B, 145. FIG. 110 show the closed circular container 147, with trapped gas 146, and the spring damper stand 148.

In combination with spring dampers 144 shown in FIG. 11A, the increased pressure from the circulation device 133 when circulating fluid to the closed container will reduce the vacuum and thus increase the volume of the closed container. If the start-stop mechanisms in the source 132, 134 are closed rapidly in sequence the damping elements (gas and spring dampers) will not be able to respond fast enough and release the extra volume of water through the source circulation conveyors 135, 136. This pressure will be released when the start-stop mechanisms 141, 143 in the extract is opened, and will transfer some fluid to the elevated container through the extract circulation conveyors 139, 140.

The volume of the closed container, including the sequence and speed when operating the start-stop mechanisms, as well as the pressure from the circulation devices will determine the volume of the fluid transferred between the source container and the elevated container.

In a variation of the above, the piston is powered, thus replacing the circulation devices. If the piston operates through the entire closed container, it may also operate as a displacement mechanism.

The technical advantage of embodiments where the piston operates as a separator, is that mixing fresh and spent water may be entirely avoided. This way, the water in the elevated containers are more efficiently replaced with fresh water. Such separation of water is also envisaged in variation 9 below.

Variation 9

It is also envisaged in FIG. 12 how the closed container will increase the efficiency in the displacement of fluids between source and extract. Since the closed container will experience switching between source and extract, this will influence how the fluids from the elevated container will dilute (mix) in the closed container.

If the elevated container is used as a marine habitat, the oxygen in the water will be depleted over time. The invention will replace air-depleted water in the elevated container with fresh oxygen rich water from the source. When the water is mixed in the closed container, it will reduce the effect of the innovation if it is required to recirculate the closed container more than once.

This is solved by a displacement barrier 159, who is sliding on a guided roller bearing attached to a central rod in the tank 160.

The source circuit consists of valves 149,158 and conveyors 152,155. The extract circuit consists of valves 150, 157 and conveyors 151,156.

It may be seen that when circulating source fluid 154 into the closed container, the displacement barrier will move to the left, and displace elevated container fluid 153 into the source container through the source circuit. Similarly, when circulating elevated container fluid 153 into the closed container the displacement barrier will move to the right, and displace source fluid into the elevated container through the extract circuit.

The displacement barrier may ensure a near 100% displacement when replacing the volume in the closed container one time. This is less efficient than the piston operation envisaged in variation 8, but may be more cost efficient when the closed container is of considerable size.

Other Variations

It is also envisaged that the parallelly and serially connected units may form a plurality of parallelly and serially coupled circulation units, with a plurality of containers. A multitude of parallelly and serially coupled circulation units will in combination create optimal circulation so that the impurities (concentrations) of fluids in different containers will be calculated according to the specified functionality of the total circulation system. In a configuration with multiple circulation units, it may also be envisaged that some circulation unis may circulate fluids with different compositions and with a different purpose than other circulation units.

By using heat exchangers between the conveyors, it is also possible to obtain energy conservation between the containers if it is required by the application.

Other variations of the invention may include filters of different kinds, to remove contaminants or other hazardous elements in the flow.

Different types of valves will have advantageous effects. It can be envisaged that the four valves on each side of the closed container, may be replaced by two rotating discs with washers and holes in it and with a central axis through the closed container. It will work as a gate-valve for the inputs and outputs on both sides of the closed container. The holes in the disk will open the source circuit at both ends, and close the extract circuit in both ends when rotating. The disk may rotate with a closing and opening rate according to the flow and displacement of the closed container. In a parallel configuration, the valve can act as a flap valve in such a way that when the input circuit on one circulation unit is closed, the other input circuit is opened. This will reduce the number of valves if inputs and outputs can be combined with valves that switches between the conveyors and circulation circuits. A number of traditional valves can be used, or custom hinged valves with switching configurations, where at least one input can switch between multiple circulation circuits.

Industrial Applicability

The invention according to the application finds use in non-resistive circulation in containers at elevated heights, using particularly energy efficient circulation units.

Fish-farming on land and elevated greenhouses are applications that predominantly need energy efficient circulation at elevated heights.

The invention will have many other industrial applications for replacement of fluid in tanks at elevated heights, where the fluid is contaminated or diluted over time, and may be replaced through circulation.

The invention has a wide range of applications, due to its extreme efficiency when circulating water to elevated containers.

The invention claimed is:

1. A system with fluid for circulating a fluid in a non-resistive manner to elevated position comprising a circulation unit comprising:
    at least one source container,
    at least one closed container, and
    at least one elevated container;
    wherein the system further comprises:
    at least one group of source conveyors for fluid circulation, operatively connected between the at least one source container and at least one closed container, and
    at least one group of extract conveyors for fluid circulation, operatively connected between the at least one closed container and the at least one elevated container,
    wherein each group of conveyors comprises
    at least one circulation circuit between at least one closed container and at least one elevated or source container, the at least one circulation circuit having a circulation input and a circulation output, and
    wherein the system is provided with
    circulation mechanisms, and
    start stop mechanisms,
    characterized in that the system achieves non-resistive circulation by circulating through one group of conveyors at a time, wherein the fluid level in the at least one elevated or source container for the circulation output is substantially equal to the fluid level in the at least one elevated or source container for the circulation input in the circulation circuit,
    wherein the circulation circuit is circulating an equal amount of fluid from the at least one elevated or source container, as it circulates to the at least one closed container.

2. The system according to claim 1, further comprising a plurality of circulation units connected in series.

3. The system according to claim 2, further comprising a plurality of serially and parallelly connected circulation units.

4. The system according to claim 2, characterized in further that at least one circulation unit of the plurality of circulation units is configured to circulate fluid with a different composition.

5. The system according to claim 2, characterized in further that at least one circulation unit of the plurality of circulation units is configured to circulate fluid in a different location.

6. The system according to claim 2, wherein at least one circulation unit of the plurality of circulation units is located below a maximum elevation limit.

7. The system according to claim 1, further comprising a plurality of circulation units connected in parallel.

8. The system according to claim 1, further comprising a plurality of open or closed source containers.

9. The system according to claim 1, further comprising a plurality of open or closed elevated containers.

10. The system according to claim 1, further comprising at least one evacuation device.

11. The system according to claim 1 further comprising sensors for monitoring of contaminants.

12. The system according to claim 1, further comprising means for electronic control of the circulation system.

13. The system according to claim 1, wherein the closed container comprises at least one fluid displacement mechanism.

14. The system according to claim 1, wherein the closed container comprises a powered displacement mechanism or a propeller, as a circulation mechanism.

15. A method for circulating a fluid in a non-resistive manner to elevated position comprising the steps of circulating through one group of conveyors a) close an extract start stop mechanism for extract conveyors for fluid circulation, operatively connected between a closed container and an elevated container, b) open a source start stop mechanism for source conveyors for fluid circulation, operatively connected between a source container and the closed container, c) activate a source circulation mechanism to circulate, fluid in a non-resistive manner through the source conveyors, d) close the source start stop mechanism for the source conveyors, e) open the extract start stop mechanism for the extract conveyors, f) activate an extract circulation mechanism to circulate fluid in a non-resistive manner through the extract conveyors.

* * * * *